(12) United States Patent
Hauck

(10) Patent No.: US 9,562,572 B2
(45) Date of Patent: Feb. 7, 2017

(54) CLUTCH DEVICE WITH A FLEX PLATE

(75) Inventor: Hans Jurgen Hauck, Schwabisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 1063 days.

(21) Appl. No.: 12/867,814

(22) PCT Filed: Feb. 16, 2009

(86) PCT No.: PCT/US2009/034206
§ 371 (c)(1),
(2), (4) Date: Nov. 2, 2010

(87) PCT Pub. No.: WO2009/105401
PCT Pub. Date: Aug. 27, 2009

(65) Prior Publication Data
US 2011/0039626 A1 Feb. 17, 2011

(30) Foreign Application Priority Data

Feb. 18, 2008 (DE) .................. 10 2008 009 701
Jul. 9, 2008 (DE) .................. 10 2008 032 273

(51) Int. Cl.
*F16D 3/02* (2006.01)
*F16D 21/06* (2006.01)
*F16D 1/104* (2006.01)
*F16D 3/72* (2006.01)
*F16D 1/10* (2006.01)

(52) U.S. Cl.
CPC .............. *F16D 21/06* (2013.01); *F16D 1/104* (2013.01); *F16D 3/72* (2013.01); *F16D 2001/103* (2013.01); *F16D 2021/0661* (2013.01)

(58) Field of Classification Search
CPC ............ F16D 21/06; F16D 1/104; F16D 3/72; F16D 2001/103; F16D 2021/0661
USPC ................ 464/68.1, 68.5, 68.6, 98, 99, 182; 192/48.611, 48.618, 70.16
See application file for complete search history.

(56) References Cited

U.S. PATENT DOCUMENTS

| 2,251,722 | A * | 8/1941 | Thomas ....................... 464/98 X |
| 4,252,227 | A * | 2/1981 | Staub, Jr. .............. F16D 13/686 192/209 |
| 4,523,916 | A * | 6/1985 | Kizler ....................... F16D 3/06 464/98 |
| 6,499,578 | B1 * | 12/2002 | Kundermann et al. .. 192/48.618 |
| 6,851,536 | B2 | 2/2005 | Orlamunder et al. |
| 6,860,373 | B2 * | 3/2005 | Kundermann et al. |

(Continued)

OTHER PUBLICATIONS

PCT International Search Report and Written Opinion dated Aug. 3, 2009; Application SN: PCT/US/2009/034206; Applicant BorgWarner Inc.; 8 pages.

*Primary Examiner* — Matthieu Setliff
(74) *Attorney, Agent, or Firm* — BrooksGroup

(57) ABSTRACT

The present invention relates to a clutch device (2) having at least one output hub (46), which can be rotationally locked to a transmission input shaft (50), an input hub (16), in which an assembly opening (54) is provided, so that a fastener (58) for axially fixing the output hub (46) to the transmission input shaft (50) can be introduced by way of the assembly opening (54), and a flex plate (74), on which a hub part (56) is provided, which can be rotationally locked to the input hub (16). According to the invention the hub part (56) can be connected to the input hub (16) in such a way that the assembly opening (54) is closed by the hub part (56).

19 Claims, 4 Drawing Sheets

(56) References Cited

U.S. PATENT DOCUMENTS

Figure 1:
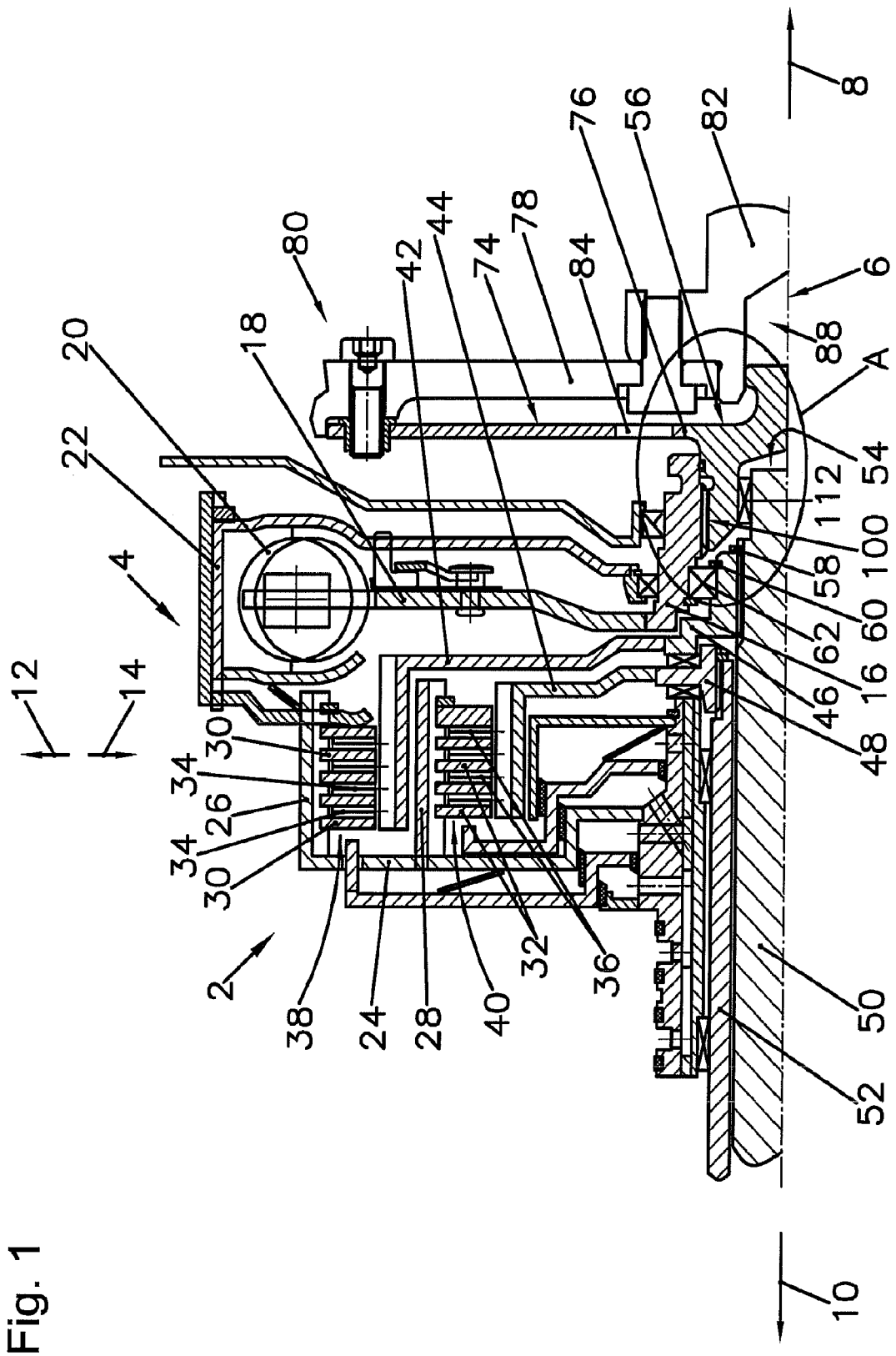

| | | |
|---|---|---|
| 6,929,107 B2 | 8/2005 | Hegerath |
| 7,147,095 B2 * | 12/2006 | Kraxner et al. ......... 192/48.618 |
| 7,322,455 B2 * | 1/2008 | Vetter et al. |
| 2005/0082136 A1 * | 4/2005 | Braford et al. |
| 2005/0252745 A1 | 11/2005 | Vanselous et al. |
| 2007/0074943 A1 | 4/2007 | Hemphill et al. |
| 2008/0041688 A1 * | 2/2008 | Bauer et al. |

* cited by examiner

CLUTCH DEVICE WITH A FLEX PLATE

The present invention relates to a clutch device having at least one output hub, which can be rotationally locked to a transmission input shaft, an input hub, in which an assembly opening is provided, so that a fastener for axially fixing the output hub to the transmission input shaft can be introduced via the assembly opening, and a flex plate, on which a hub part is provided, which can be rotationally locked to the input hub.

The state of the art discloses clutch devices, in particular multiple-clutch devices, such as dual clutches, for example, which are provided with an input hub and at least one output hub. DE 10 2005 045 158 A1, for example, describes a dual clutch device with an input hub and two output hubs, the latter each having the facility for rotational locking to a transmission input shaft of a transmission. The input hub of the known clutch device can be directly connected to an engine output shaft of an engine and has a central assembly opening. Once the known clutch device has been inserted into the transmission bell housing, so that the output hubs are each rotationally locked to a transmission input shaft, a fastener for axially fixing one of the two output hubs to the associated transmission input shaft can be introduced via the assembly opening. If the fastener, in this case a bolt, is introduced via the assembly opening and the one output hub is therefore axially fixed to one of the transmission input shafts, the assembly opening must then be sealed by means of a closing or sealing part, in order to prevent oil escaping from the wet-running dual clutch device. Any operation of the known dual clutch device is therefore possible only once the closing or sealing part has been fitted.

Also known in the case of hydrodynamic torque converters is the provision of so-called flex plates between the input side of the torque converter and an output side of a power unit, which on the one hand can transmit a torque from the drive side to the input side of the torque converter and on the other is capable of cushioning axial misalignments of the drive-side component in such a way that these are not transmitted to the input side of the torque converter. It is to be noted, however, that the flex plates used for this purpose generally have a low flexibility and primarily serve for said transmission of torque from the drive side to the input side of the torque converter and for the connection to a flywheel, the connection diameter of which is particularly large. In the past such flex plates have also been used between a power unit on the one hand and a clutch device on the other, in order to prevent the axial misalignment of the drive-side component being transmitted to the clutch device. Thus the state of the art in particular discloses clutch devices, the input hub of which is rotationally locked to a flex plate, the flex plate additionally being rotationally locked to a flywheel on the drive side.

Although the dual clutch device described above with reference to DE 10 2005 045 158 A1 has been tried and proven, the use of a flex plate, which can be rotationally locked to the input hub of the known dual clutch device, would entail an exceptionally high assembly outlay. For example, the fastener would first have to be introduced through the assembly opening, before then closing the assembly opening by means of the closing or sealing part. The rotationally fixed attachment of the flex plate can here be done before or after the aforementioned assembly operations.

The object of the present invention, therefore, is to create a clutch device having an input hub, in which an assembly opening is provided, and a flex plate which can be rotationally locked to the input hub, the intention being to make assembly of the clutch device according to the invention especially rapid and easy.

This object is achieved by the features specified in claim 1. Advantageous embodiments form the subject matter of the dependent claims.

The clutch device according to the invention comprises at least one output hub, which can be rotationally locked to a transmission input shaft. The clutch device may be a multiple-clutch device, for example, preferably a dual clutch device, which therefore has two output hubs, which can each be rotationally locked to a transmission input shaft of a transmission. In this way a torque can be transmitted from the clutch device via the respective output hub to the associated transmission input shaft. The clutch device further comprises an input hub, via which a torque can be introduced into the clutch device. Thus the input hub, for example, can be rotationally locked to a drive-side component of the drivetrain. A preferably central assembly opening is provided in the input hub. The assembly opening allows a fastener for axially fixing the output hub to the transmission input shaft to be introduced via or through the assembly opening. The clutch device can therefore be fixed as a module to the transmission, so that at least one transmission input shaft extends into the clutch device, which means that only then does the output hub need to be axially fixed to one of the transmission input shafts by inserting the fastener through the assembly opening. The clutch device according to the invention further comprises a so-called flex plate, on which a hub part is provided, which can be rotationally locked to the input hub. The meaning of the term 'flex plate' is here the same as the English-language term 'flexplate' used among experts. A flex plate can therefore be taken to mean, in particular, a torque-transmitting plate, which is of a flexible design in an axial direction, such that an axial misalignment of the input side in relation to the output side of the torque-transmitting plate is not transmitted to the output side of the torque-transmitting plate or vice-versa. Reference may be made to the state of the art with regard to this. According to the invention the hub part provided on the flex plate can be connected to the input hub in such a way that the assembly opening can be closed by the hub part itself.

In the case of the clutch device according to the invention this can first be arranged as a module on the transmission of the drivetrain, so that at least one transmission input shaft extends into the clutch device and is rotationally locked to least one output hub. A fastener, preferably a retainer ring or a bolted part, for axially fixing the output hub to the transmission input shaft can then be introduced via or through the assembly opening. Once the output hub has been axially fixed to the transmission input shaft by means of the fastener, there is no need to introduce a separate closing or sealing part into the assembly opening. Instead the flex plate merely has to be rotationally locked to the input hub via the hub part provided thereon, so that the hub part at the same time closes the assembly opening in the input hub. This firstly reduces the number of parts in the clutch device and secondly makes it possible to dispense with an additional assembly operation. The assembly of the clutch device and its incorporation into a drivetrain is therefore permanently simplified.

In an advantageous embodiment of the clutch device according to the invention the hub part can be connected to the input hub in such a way that the assembly opening can be closed with a preferably fluid-tight seal, more preferably still an oil-tight seal, by the hub part. For this purpose further sealing means, for example, may be provided on the input hub and/or the hub part of the flex plate. The sealing function of the hub part means that the clutch device can therefore be operated as a wet-running clutch device, without the clutch fluid, preferably oil, being able to escape via the assembly opening, which would inevitably lead to a functional impairment of the wet-running clutch device.

In a particularly advantageous embodiment of the clutch device according to the invention the hub part on its side remote from the input hub comprises a first projection, preferably a so-called pilot spigot. The first projection may be nested in a radial direction with an output shaft of a power unit, that is to say the first projection may enclose the output shaft of a power unit in a radial direction and/or may be enclosed in a radial direction by the output shaft. It is preferable here, however, if the first projection can be introduced into a central end-face recess in the output shaft. The first projection means that the clutch device is especially easy to incorporate into the drivetrain, the term 'output shaft of a power unit' being taken to mean not only the actual engine output shaft, but also the components having a rotational drive connection thereto, such as a flywheel, for example.

In a further advantageous embodiment of the clutch device according to the invention the first projection and the output shaft can preferably be nested in a radial direction in such a way that these are capable of supporting one another in a radial direction. This also substantially facilitates the incorporation of the clutch device according to the invention into a drivetrain, especially since it also serves to bring the axes of rotation of the output shaft and the clutch device into alignment one behind the other. In this context it is more preferable still if the first projection and the output shaft are configured in such a way that these center one another when fitted into one another.

In order to prevent the first projection tilting inside the central end-face recess in the output shaft in the event of any skewing of the axis of rotation of the drive components in relation to the axis of rotation of the clutch device, the first projection in the axial direction comprises a section facing the input hub and a support section remote from the input hub, the output shaft being supportable solely on the support section. Consequently no support is afforded on the section facing the input hub, so that tilting is reliably prevented. In this embodiment the first projection is preferably of a mushroom-shaped design, so as to further enhance the aforementioned advantage.

In order to further facilitate the assembly of the flex plate with the hub part on the input hub of the clutch device, in a preferred embodiment of the clutch device according to the invention the hub part may be rotationally locked to the input hub by means of a slip-on gearing. In order to form the slip-on gearing, the hub part together with the flex plate merely has to be brought together with the input hub in an axial direction, the slip-on gearing preferably being formed by an internal toothing on the one hand and an external toothing on the other. Thus the internal toothing may be provided on the hub part of the flex plate, for example, whilst the external toothing is provided on the input hub of the clutch device. It is preferable, however, if the internal toothing is provided on the input hub, whilst the external toothing is formed on the hub part of the flex plate, as will be explained in more detail below with reference to a further embodiment. In either case it is more preferable still, if the internal toothing and the external toothing are formed as straight teeth, in order to facilitate assembly.

In a particularly preferred embodiment of the clutch device according to the invention the slip-on gearing is embodied as a press-fit toothing free of torsional play. This serves to prevent rattling noises in the transmission of torque from the hub part to the input hub, which derive from an alternating collision of the gear tooth profiles of the internal and external toothing. The clutch device according to the invention in this embodiment is therefore particularly quiet in operation.

In a further advantageous embodiment of the clutch device according to the invention the press-fit toothing free of torsional play formed by the slip-on gearing is embodied in such a way that during operation of the clutch device the hub part is in an axial direction immovably fixed to the input hub. In this embodiment the internal and external toothing forming the press-fit toothing must therefore be dimensioned in such a way that even in the event of an axial misalignment of the input side of the flex plate in relation to the output side of the flex plate, no shifting of the hub part occurs in an axial direction relative to the input hub. In this embodiment a compensation for axial tolerances between the drive-side components and the clutch device inside the drivetrain is brought about during the assembly or press-fitting process, in that the hub part together with the flex plate is inserted or pressed to a greater or lesser extent into or onto the input hub. The clutch device according to the invention therefore allows an especially simple and durable compensation for tolerances between the clutch device on the one hand and the drive-side components of the drivetrain on the other.

In order to facilitate the rotationally locked connection of the hub part to the input hub and in particular the production of a press-fit toothing free of torsional play between the hub part and the input hub, in a further preferred embodiment of the clutch device according to the invention at least one recess is provided in the hub part or the flex plate, whilst at least one retaining device is provided on the input hub, in such a way that in a predefined rotational or assembly position of the hub part and the flex plate relative to the input hub the retaining device is arranged at least on a common radial with the recess. Thus a retaining element of a pressing tool for producing the press-fit toothing, such as a hook-shaped retaining element, for example, can be fed through the recess and connected to the retaining device. The retaining element can then be used to exert a tensile force on the input hub in an axial direction, whilst a punch or the like of the pressing tool might exert a compressive force on the hub part in the opposite axial direction. In this way the hub part and the input hub are assembled or pressed together forming the press-fit toothing free of torsional play. In this embodiment it is preferred if the recess is provided in the flex plate. This has the advantage, compared to a recess in the hub part, that the recess in the flex plate gives it a greater flexibility. Furthermore a recess in the thin-walled flex plate is substantially easier to produce than a recess in the more solid hub part. A recess in the hub part, on the other hand, has the advantage that depending on the design of the hub part the recess can be arranged further inwards in a radial direction. In addition it is furthermore preferred if the retaining device and the recess are arranged in such a way that in the predefined rotational or assembly position of the hub part and the flex plate relative to the input hub the retaining device is arranged in alignment with the recess in an axial direction. In the case of the last aforementioned design variant, an especially rapid access to the retaining device by means of the retaining element of the pressing tool is possible, thereby further facilitating the process of fitting the hub part and the flex plate to the input hub. Regardless of which design variant of this embodiment is selected, multiple recesses may be provided in the hub part or the flex plate, but preferably in the hub part, which in the predefined rotational or assembly position are each assigned to a continuous retaining device or each assigned to one of a plurality of retaining devices on the input hub. Thus two or more recesses should preferably be provided, in order to allow a uniform compression of the hub part and the input hub. In this context it is also preferable if at least two recesses are arranged uniformly distributed or spaced in a circumferential direction. The same applies analogously to the retaining devices, if more than one retaining device is provided.

In a further particularly preferred embodiment of the clutch device according to the invention the retaining device is arranged on the end face of the input hub. If the retaining device, in the predefined rotational or assembly position of the hub part and the flex plate, is here furthermore arranged in axial alignment with the recess in the hub part or the flex plate, this affords an especially direct and rapid access to the retaining device by means of the retaining element of the pressing tool. Furthermore in this case the retaining element need not necessarily be hook-shaped. Instead it is here preferred if the end-face retaining device is embodied as a tapped hole, so that the retaining element of the pressing tool may also be embodied as a rod or shaft provided with a mating thread, such as a bolt, for example. In this case the tapped hole affords an especially secure hold for the retaining element inside the retaining device in the form of the tapped hole.

In a further preferred embodiment of the clutch device according to the invention, which represents an alternative development of the embodiment previously described, the retaining device is formed by a circumferential groove, with which the retaining element of the pressing tool can be brought into engagement, and/or a circumferential collar on the input hub, behind which the retaining element of the pressing tool can grip. In such a case a hook-shaped retaining element of the pressing tool would again lend itself to this purpose, in order to allow the input hub to grip securely over the retaining device provided thereon. Said two retaining devices are moreover particularly easy to produce.

In a further advantageous embodiment of the clutch device according to the invention the hub part, on its side facing the input hub, comprises a second projection, which is capable of nesting in a radial direction with the input hub. This means that the second projection can enclose the input hub or the input hub can enclose the second projection in a radial direction. It is preferred, however, if the input hub externally encloses the second projection and the second projection can be introduced into the assembly opening. In each case the second projection and the input hub are formed in such a way that these can be supported against one another in a radial direction. This allows an especially easy positioning of the hub part and the flex plate in relation to the input hub during the assembly process. In order to afford the fastest possible matching of the axis of rotation of the hub part to the axis of rotation of the input hub when fitting the hub part to the input hub, it is furthermore preferred for the hub part and the input hub to be configured in such a way that the hub part can be centered in relation to the input hub by means of the second projection.

In a further preferred embodiment of the clutch device according to the invention the second projection in the axial direction comprises a toothed section with an external toothing. The toothed section therefore forms an axial section of the second projection. The input hub by contrast comprises an internal toothing, which is preferably provided inside the assembly opening of the input hub. The external and internal toothing form the slip-on gearing in the rotationally locked connection of the hub part to the input hub.

In a further advantageous embodiment of the clutch device according to the invention the second projection in the axial direction comprises a preferably cylindrical sealing section. The sealing section therefore forms an axial section of the second projection. In the rotationally locked connection of the hub part to the input hub the sealing section seals off a gap formed between the hub part and the input hub. It is preferred here if the sealing effect is achieved with the interposition of a seal between the sealing section on the one hand and the input hub on the other. Such a seal may be a simple ring seal, for example. It is particularly advantageous here if the seal is arranged on or pre-fitted to the sealing section. This is advantageous particularly where the sealing section is a sealing section which can be introduced into the assembly opening, especially since the seal can then simply be externally applied around the sealing section. It is furthermore preferred if in the sealing section a preferably circumferential groove is provided, in which the seal can be securely arranged, before the hub part is rotationally locked to the input hub.

In the embodiment of the clutch device previously described the sealing section, with the possible interposition of a seal, seals off a gap formed between the hub part and the input hub. In a further preferred embodiment of the clutch device according to the invention the sealing section is further embodied as a centering section, that is to say the sealing section acting as centering section not only seals off but also centers the hub part in relation to the input hub, so that their axes of rotation coincide. This obviates the need for an additional axial section in the form of a centering section, thereby reducing the overall axial length of the hub part and hence the weight. In addition a sealing section embodied as centering section also assumes the function of a support section, which reliably prevents a tilting of the hub part in relation to the input hub. Thus any tilting forces occurring can be absorbed by the sealing section serving as support section.

In order to allow particularly easy production and assembly of the input hub and the hub part, the toothed section is in the axial direction formed on the side of the second projection facing the input hub, whilst the sealing section is formed on the side of the second projection remote from the input hub. This means that in the case of a hub part according to this embodiment the tip diameter of the external or internal toothing on the hub part, for example, can correspond approximately to the outside or inside diameter of the sealing section, so that the production cost for such a hub part is relatively low. Similarly the root diameter of the internal or external toothing on the input hub can correspond approximately to the inside or outside diameter of the assembly opening, thereby also reducing the production cost for the input hub.

In a further advantageous embodiment of the clutch device according to the invention the second projection has a central end-face depression, into which the transmission input shaft can be introduced, preferably endways. This means that the second projection can have a sufficient overall axial length to bring about both the rotationally locked connection to the input hub and the sealing of the gap between the input hub on the one hand and the hub part on the other, without any unwanted end-face collision occurring with the transmission input shaft. It is preferred here if the transmission input shaft can be or is supported in a radial direction on the second projection, this preferably being achieved by way of a radial bearing. The latter moreover produces a centering of the hub part and the input hub in relation to the transmission input shaft. Supporting the transmission input shaft in a radial direction on the second projection furthermore largely precludes any tilting movement of the hub part and the input hub in relation to the transmission input shaft.

In a further advantageous embodiment of the clutch device according to the invention the flex plate rotationally locked to the hub part together with the hub part forms a continuous module that can be connected to the input hub. This module therefore does not consist of individual parts, which would have to be successively connected to the input hub and the clutch device. Instead the continuous module comprising the flex plate and the hub part can be connected as a whole to the input hub. It is preferred here if the flex plate is integrally formed with the hub part. The latter design variant is to be chosen, however, only if the flex plate has substantially the same wall thickness as the hub part. Since this is rarely the case, especially as the flex plate is generally of more thin-walled design than the hub part, the flex plate is alternatively fixed to the hub part by a materially cohesive joint, this being done more preferably still by welding the flex plate to the hub part. In a further preferred alternative the flex plate is connected to the hub part by force closure and/or positively interlocking connection, being more preferably still bolted or riveted to the hub part.

The aforementioned flex plate makes it possible to compensate for axial misalignments of the drive-side components, so that these are transmitted only in an attenuated form, if at all, to the input hub of the clutch device. It is furthermore advisable to cushion the torque fluctuations deriving from the power unit in such a way that these are not transmitted to the transmission input shaft. For this reason the clutch device further comprises a torsional vibration damper, the input hub of the clutch device being formed by the input hub of the torsional vibration damper. Thus the torsional vibration damper is preferably integrated into the housing of the clutch device and is arranged in the wet chamber inside the clutch housing. The clutch device is here preferably embodied as a multiple-clutch device, more preferably still as a wet-running multiple-clutch device, for example as a dual clutch device.

Figure 2:
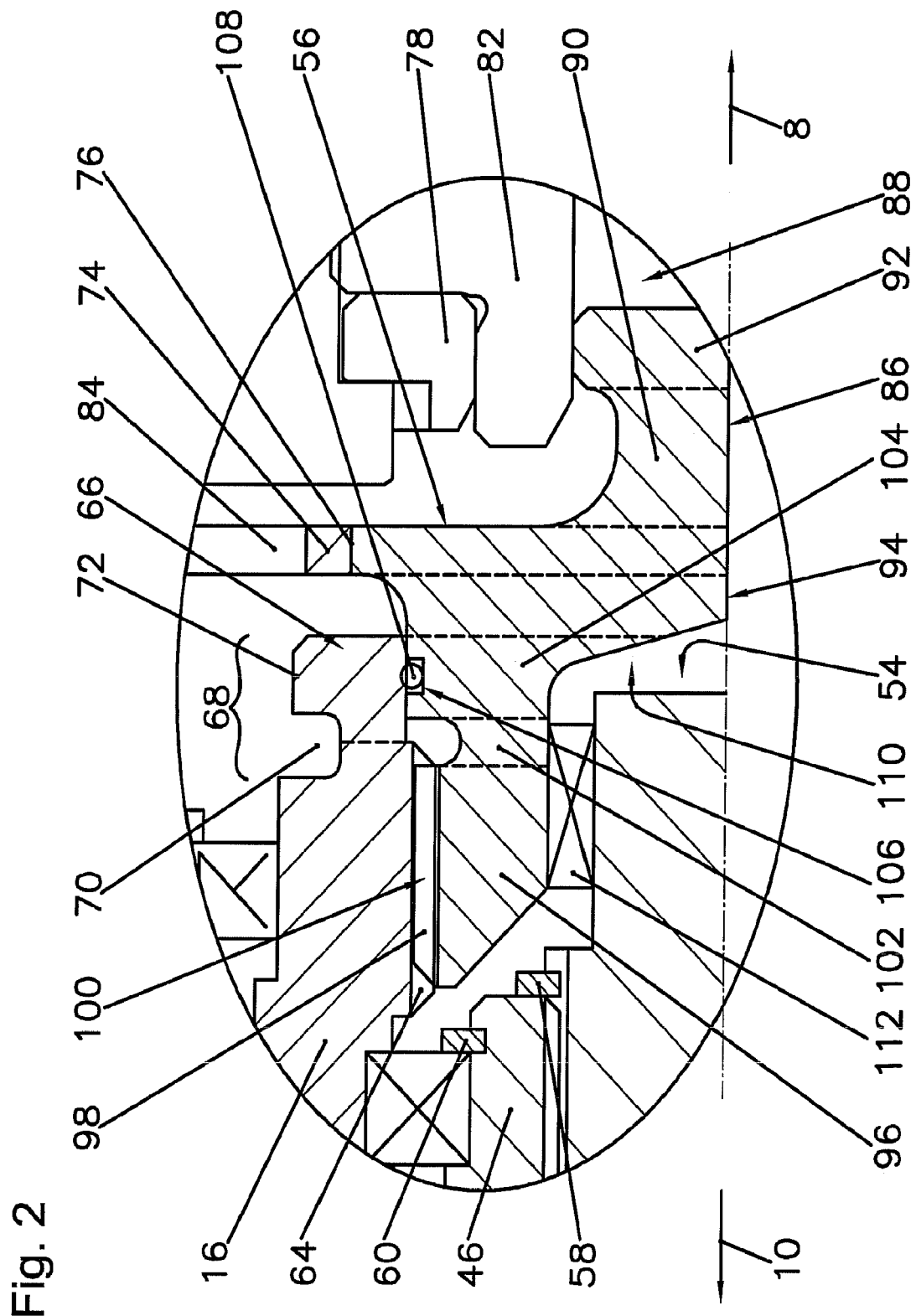
Figure 3:
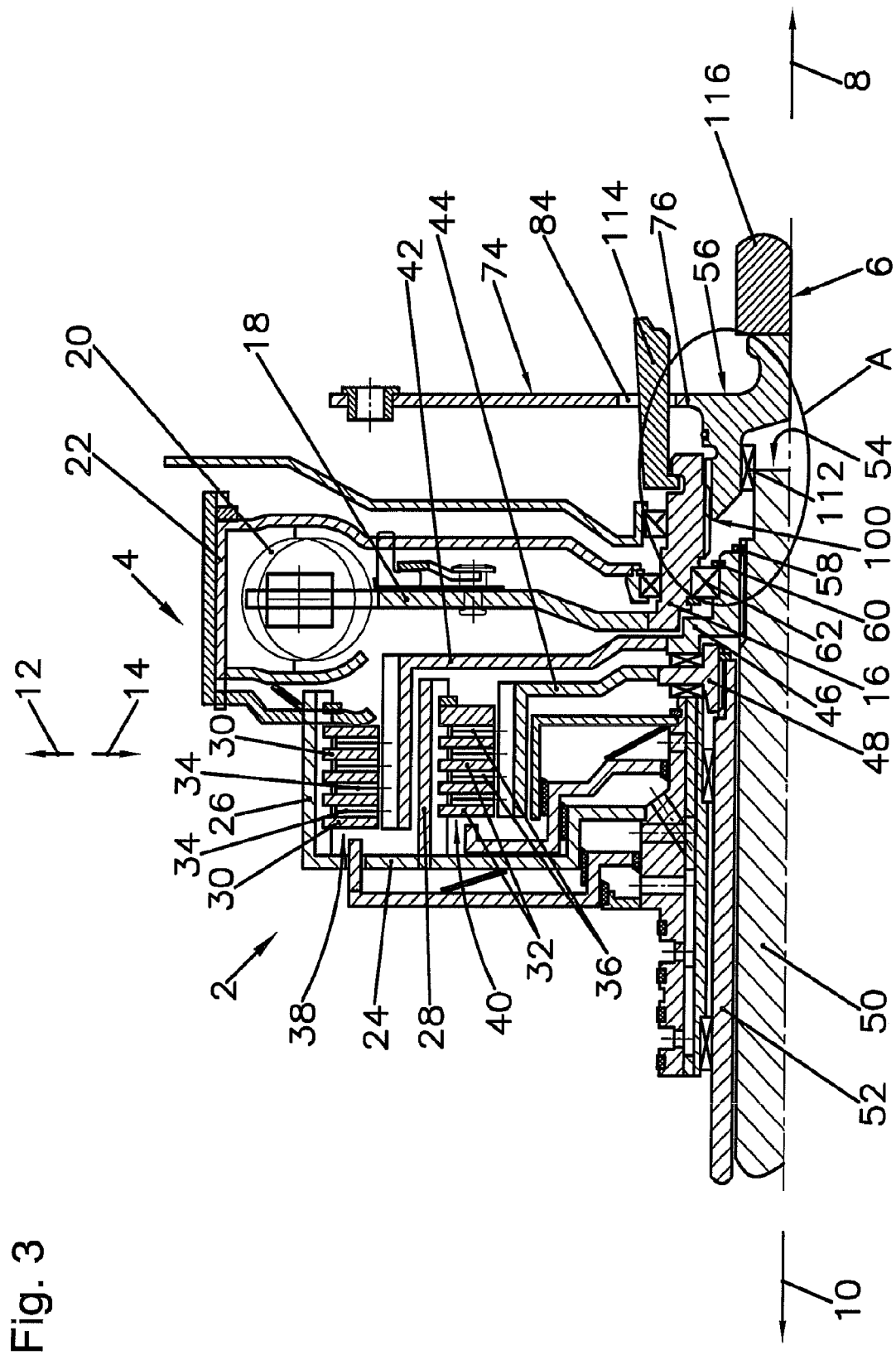
Figure 4:
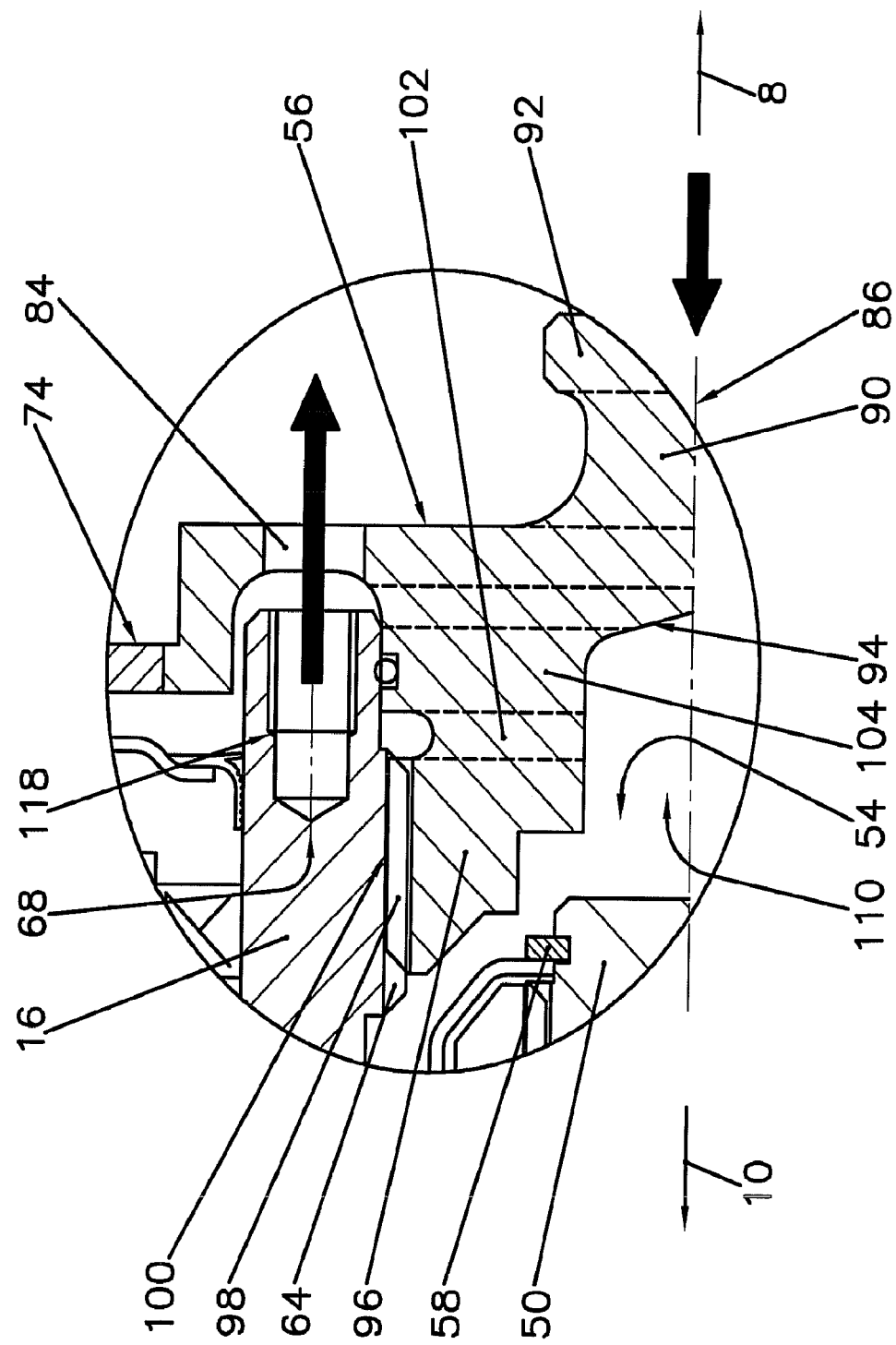

The invention will be explained in more detail below on the basis of exemplary embodiments and with reference to the drawings attached, in which:

FIG. 1 in a sectional representation shows a partially side view of a first embodiment of the clutch device according to the invention, FIG. 2 an enlarged representation of the detail A from FIG. 1, FIG. 3 shows the clutch device from FIG. 1 when fitting the hub part and the flex plate to the input hub and FIG. 4 in a sectional representation shows a partially side view of a second embodiment of the clutch device according to the invention in the area of the input hub.

FIG. 1 shows an embodiment of the clutch device 2 according to the invention and its arrangement in a drivetrain of a motor vehicle. The clutch device 2 shown is embodied as a wet-running multiple-clutch device, in this case as a dual-clutch device. The clutch device 2 further comprises an input-side torsional vibration damper 4, which is integrated into the clutch device 2. The axis of rotation of the clutch device 2 is denoted in the drawings by the reference numeral 6, whilst the two opposing axial directions 8, 10 are indicated by arrows. In addition the opposing radial directions 12, 14 are likewise represented by arrows.

The clutch device 2 comprises an input hub 16 arranged in an axial direction 8, that is to say on the drive side, which equally represents the input hub 16 of the torsional vibration damper 4. The input hub 16 is rotationally locked to a primary element 18 in the form of a torque-transmitting plate. Supported on the primary element 18 in a radially outward direction 12 are spring devices 20 running in a circumferential direction, which bring about a rotational drive connection to a secondary element 22 of the torsional vibration damper 4 and are embodied in such a way that any torque surges of the primary element 18 are cushioned or attenuated, so that the torque surges are transmitted from the primary element 18 to the secondary element 22 of the torsional vibration damper 4 only to a limited extent.

In an axial direction 10 the secondary element 22 is rotationally locked to a housing-shaped outer plate carrier 24. The outer plate carrier 24 comprises two substantially tubular support sections 26, 28, which are rotationally locked to outer plates 30, 32. The outer plates 30, 32 are arranged so that they are axially displaceable on the associated support section 26, 28, inner plates 34, 36 being arranged between the outer plates 30, 32 in an axial direction 8 or 10. Thus the outer plates 30 together with the inner plates 34 form a first plate pack 38, whilst the outer plates 32 together with the inner plates 36 form a second plate pack 40. The two plate packs 38, 40 are arranged nested in a radial direction 12 or 14, that is to say in this case the first plate pack 38 externally encloses the second plate pack 40 in a radial direction 12.

The inner plates 34 of the first plate pack 38 are rotationally locked to, but axially displaceable with a first inner plate carrier 42, whilst the inner plates 36 of the second plate pack 40 are axially displaceable with and rotationally locked to a second inner plate carrier 44. In a radially inward direction 14 a first output hub 46 adjoins the first inner plate carrier 42, whilst the second inner plate carrier 44 comprises a second output hub 48 situated inside in a radial direction 14. Whilst the first output hub 46 can be rotationally locked via a slip-on gearing to an inner first transmission input shaft 50, the second output hub 48 can likewise be rotationally locked via a slip-on gearing to a second transmission input shaft 52, situated outside or embodied as a hollow shaft, shown in the already fitted state in FIG. 1.

The further construction of the input hub 16 will be explained in more detail below with reference to FIGS. 1 and 2. The input hub 16 has a central assembly opening 54 passing right through it in an axial direction 8 or 10. The assembly opening 54 is dimensioned in such a way that a fastener for axially fixing the first output hub 46 to the first transmission input shaft 50 can be introduced in an axial direction 10 via or through the assembly opening 54 into the clutch device 2, provided that the hub part 56, described in more detail below, has not yet been inserted into the assembly opening 54. In this embodiment the fastener for axially fixing the first output hub 46 to the first transmission input shaft 50 is formed by a retainer ring 58 that can be attached to the first transmission input shaft 50. In addition a further retainer ring 60 can be introduced in an axial direction 10 through the assembly opening 54 into the clutch device 2, the further retainer ring 60 serving for the axial fixing of a radial bearing 62, used to support the first output hub 46 on the input hub 16 from a radially inward direction 12.

The input hub 16 further comprises an internal toothing 64 facing the assembly opening 54, which takes the form of a straight teeth, the teeth of the internal toothing 64 extending parallel to the axis of rotation 6. The internal toothing 64 is here formed in an axial section of the input hub 16, which is offset in an axial direction 10 in relation to an end-face axial section 66 situated in an axial direction 8. The root diameter of the internal toothing 64 here preferably corresponds to the inside diameter of the assembly opening 54 in the area of the end-face axial section 66.

In the area of the end-face axial section 66 a retaining device 68, the significance of which will be examined in more detail with reference to FIG. 3, is provided on the input hub 16 or the outer circumference thereof. The retaining device 68 consists on the one hand of a groove 70, running in a circumferential direction and inset in an axial direction 10, and on the other of a collar 72 running in a circumferential direction and defining the circumferential groove 70 in an axial direction 8.

The clutch device 2 further comprises a flex plate 74, which in an inward radial direction 14 is rotationally locked to the aforementioned hub part 56. The hub part 56 can be rotationally locked to the input hub 16, as will be explained in more detail below. The flex plate 74 rotationally locked to the hub part 56 together with the hub part 56 forms a continuous module that can be connected to the input hub 16, the module comprising the hub part 56 and the flex plate 74 being shown in the already fitted state in FIGS. 1 and 2, in which a rotationally locked connection exists between the hub part 56 and the input hub 16. In order to obtain a rotationally locked connection between the flex plate 74 and the hub part 56, the flex plate 74 could be integrally formed with the hub part 56, for example, that is to say the flex plate 74 and the hub part 56 could have been produced from a continuous basic workpiece. Since this is relatively difficult to achieve, however, owing to the different wall thickness of the flex plate 74 and the hub part 56, in the embodiment shown the flex plate 74 is welded to the hub part 56 via welding points 76, in order to obtain a cohesive material connection or attachment. Alternatively, however, the flex plate 74 could also be connected to the hub part 56 by force closure and/or a positively interlocking joint, this preferably being done by bolting or riveting.

The flex plate 74, which can also be described as a torque-transmitting plate flexible in an axial direction 8 or 10, can in an outer area in a radial direction 12 be rotationally locked to a drive-side component, the drive-side component in this example being formed by the drive-side flywheel 78. The rotationally locked connection of the flex plate 74 to the flywheel 78 is in this example achieved by means of a bolted connection 80. The flywheel 78 is in turn rotationally locked at its end pointing inwards in a radial direction 14 to an output shaft 82 of a power unit, not shown further. In a radial direction 12 or 14 between the welding points 76 and the bolted connection 80 the flex plate 74 further comprises multiple recesses 84 passing through it in an axial direction 8 or 10, which in the radial direction 12 or 14 are situated approximately on a level with the retaining device 68 on the input hub 16 and the function of which will be explained in more detail below. Although the recesses 84, in the embodiment shown in FIGS. 1 to 3, are provided in the flex plate 74, these may also be located inside the hub part 56, as will be described later with reference to a second embodiment.

The hub part 56 will be described in more detail below with reference to FIGS. 1 and 2. The hub part 56 on its side remote from the input hub 16, comprises a first projection 86, which is preferably embodied as a pilot spigot and extends in an axial direction 8 in the direction of the output shaft 82. This first projection 86 may be nested with the output shaft 82 in a radial direction 12 or 14. For this purpose a central recess 88, into which the first projection 86 embodied as pilot spigot can be introduced in an axial direction 8, is provided in the end face of the output shaft 82 remote from the power unit. The first projection 86, which is of a substantially mushroom-shaped design, substantially consists of two axial sections, that is to say a section 90 facing the input hub 16 and a support section 92 remote from the input hub 16. The outside diameter of the support section 92 is matched to the inside diameter of the central recess 88 in the output shaft 82 in such a way that the output shaft 82 can be supported in a radial direction 14 on the outer circumference of the support section 92, and vice-versa. The section 90 facing the input hub 16 on the other hand has a smaller diameter, so that the output shaft 82 cannot be supported on the section 90 of the first projection 86 in a radial direction 14. It is preferred here if the support section 92 and the central recess 88 are matched to one another in such a way that the hub part 56 is centered in relation to the output shaft 82 when the first projection 86 is introduced into the central recess 88 of the output shaft 82.

On its side facing the input hub 16 and remote from the first projection 86 the hub part 56 has a second projection 94, which extends in an axial direction 10. The second projection 94 may be arranged nested with the input hub 16 in radial direction 12 or 14, this being achieved in the embodiment shown in that the second projection 94 can be introduced in an axial direction 10 into the assembly opening 54 in the input hub 16, FIGS. 1 and 2 showing the already fitted state.

The second projection 94 is also divided into multiple axial sections. Thus the second projection 94 first comprises an end-face toothed section 96, which is provided with an external toothing 98. The external toothing 98 of the toothed section 96 is, like the internal toothing 64 of the input hub 16, embodied as straight teeth, the teeth of the external toothing 98 likewise extending parallel to the axis of rotation 6, The external toothing 98 together with the internal toothing 64 can therefore form a slip-on gearing 100, which with the hub part 56 in the fitted state brings about a rotationally locked connection between the hub part 56 and the input hub 16. The external toothing 98 should here be matched to the internal toothing 64 in such a way that in inserting the hub part 56 into the input hub 16 a press-fit toothing free of torsional play is produced, as will be explained in more detail below with reference to FIG. 3.

In an axial direction 8 an intermediate section 102 adjoins the toothed section 96, the outside diameter of which is smaller than the tip diameter of the external toothing 98 and smaller than the root diameter thereof. In an axial direction 8 the intermediate section 102 is succeeded by a sealing section 104, which can also function as a support section. The cylindrical sealing section 104 of the second projection 94 of the hub part 56 has an outside diameter, which corresponds approximately to the tip diameter of the external toothing 98, but should be designed slightly larger. In the outer circumference of the sealing section 104 a circumferential groove 106 is provided, inside which a seal 108 in the form of a sealing ring is arranged. The sealing section 104 or the outside diameter thereof is matched to the end-face axial section 66 or the inside diameter thereof in such a way that the second projection 94 of the hub part 56 can be supported in a radial direction 12 on the inside of the input hub 16, and vice-versa. Here the sealing section 104 and the end-face axial section 66 of the input hub 16 are preferably designed in such a way that the hub part 56 is centered in relation to the input hub 16 when the hub part 56 is inserted with the second projection 94 into the assembly opening 54. The sealing section 104 can also in this respect be described as a centering section.

As will be apparent from FIGS. 1 and 2 and the associated description, the toothed section 96 in the axial direction 8 or 10 is therefore formed on the side of the second projection 94 facing the input hub 16, whilst the sealing section 104 is formed on the side of the second projection 94 remote from the input hub 16. This substantially facilitates the production of the external toothing 98 on the hub part 56 on the one hand and the production of the internal toothing 64 on the input hub 16 on the other.

In order to be able to form both the toothed section 96 and the sealing section 104, the second projection 94 must have a large overall axial length. However, this may possibly lead to a restriction of the overall axial length of the transmission input shaft 50. In order to prevent this, the second projection 94 has an end-face central depression 110 facing the transmission input shaft 50. The end section of the transmission input shaft 50 facing the hub part 56 can be introduced into the depression 110 in an axial direction 8, so that the transmission input shaft 50 can also in a radial direction 12 or 14 be arranged nested with the second projection 94 of the hub part 56. The transmission input shaft 50 can here preferably be supported in a radial direction 12 on the second projection 94, this preferably being achieved by way of a radial bearing 112. The nesting of the hub part 56 with the transmission input shaft 50 is also intended to produce a centering of the hub part 56 in relation to the transmission input shaft 50, in order to prevent the occurrence of unbalances during the operation of the drivetrain.

Further features of the clutch device 2 according to the invention and the procedure for rotationally fixed locking of the hub part 56 to the input hub 16 will be described below with reference to the FIG. 3.

First the clutch device 2 without the module comprising the flex plate 74 and the hub part 56 is pushed in an axial direction 10 onto the transmission input shafts 50, 52, so that the transmission input shafts 50, 52 extend in an axial direction 8 into the clutch device 2. This brings about a rotationally locked connection between the first output hub 46 and the first transmission input shaft 50 and between the second output hub 48 and the second transmission input shaft 52, which is achieved by the aforementioned slip-on gearings. Before the hub part 56 of the continuous module comprising the hub part 56 and the flex plate 74 is rotationally locked to the input hub 16, the retainer ring 58 is first introduced in an axial direction 10 through the assembly opening 54 in the input hub 16, the retainer ring 58 axially fixing the first output hub 46 to the first transmission input shaft 50. The retainer ring 60 can also be introduced in an axial direction 10 through the assembly opening 54 in the input hub 16, which then axially fixes the radial bearing 62 to the first output hub 46. However the retainer ring 60 may also have already been fitted to the clutch device 2 whilst assembling the torsional vibration dampers 4. The clutch device 2 is now therefore axially fixed to the first transmission input shaft 50.

Whereas in conventional clutch devices with an assembly opening in the input hub a separate closing or sealing part would have to be introduced into the assembly opening, in order to prevent a subsequent escape of the coolant and lubricant from the wet-running clutch device, this additional operation is no longer necessary in the case of the clutch device according to the invention. Instead, after axially fixing the clutch device 2 to the transmission input shaft 50, it is possible to proceed immediately with the rotationally locked attachment of the module, comprising the hub part 56 and the flex plate 74, to the input hub 16, a possible procedure for this being described below.

The hub part 56 of the module comprising the hub part 56 and the flex plate 74 is first rotated about the axis of rotation 6 into a predefined rotational or assembly position of the hub part 56 relative to the input hub 16, so that the external toothing 98 of the hub part 56 can be inserted in an axial direction 10 into the internal toothing 64 of the input hub 16. In the predefined rotational or assembly position of the hub part 56, the retaining device 68 on the input hub 16 is located on a common radial with the recesses 84 in the flex plate 74 and the hub part 56, when the components are viewed in an axial direction 8 or 10. Substantial parts of the retaining device 68 are furthermore arranged in alignment with the recesses 84 in an axial direction 8 or 10. In this rotational or assembly position multiple hook-shaped retaining elements 114 can now be fed in an axial direction 10 through the recesses 84, in order to be connected to the retaining device 68 on the input hub 16. The hook-shaped retaining element 114 is here connected to the retaining device 68 in that the hook-shaped retaining element 114 of the pressing tool is brought into engagement with the circumferential groove 70 or the hook-shaped retaining element 114 is made to grip behind the circumferential collar 72. The pressing tool further comprises a central punch 116, which is brought in an axial direction 10 up to the end face of the first projection 86 of the hub part 56 and into contact with the latter.

The punch 116 is then pressed against the hub part 56 in an axial direction 10, whilst the retaining elements 114 remain in their position shown in FIG. 3. As a result the second projection 94 of the hub part 56 is pressed into the assembly opening 54 in the input hub 16, producing the press-fit toothing between the external toothing 98 and the internal toothing 64. Under continuing pressure the sealing section 104 of the hub part 56 also passes into the assembly opening 54, so that with the interposition of the seal 108 between the hub part 56 on the one hand and the input hub 16 on the other the hub part 56 brings about not only a closure but also a sealing of the assembly opening 54. In the process the assembly opening 54, by virtue of the hub part 56 and the seal 108 arranged thereon is closed with a preferably fluid-tight seal, more preferably still an oil-tight seal, the final assembly position being shown in FIGS. 1 and 2. The press-fit toothing between the external toothing 98 on the one hand and the internal toothing 64 on the other should here be designed in such a way that the hub part 56 is immovably fixed to the input hub 16 in an axial direction 8 or 10 on completion of the pressing process, as has been described with reference to FIG. 3, and during subsequent operation of the clutch device 2. In the process of pressing the hub part 56 in, a compensation for axial tolerances can therefore be achieved, among other things between the clutch device 2 on the one hand and the drive-side components, such as the flywheel 78 or the output shaft 82, for example, on the other, by pressing the hub part 56 further or less far into the input hub 16 in axial direction 10.

A second embodiment of the clutch device according to the invention 2 will be described below with reference to FIG. 4, the construction of the clutch device 2 in the second embodiment corresponding substantially to the embodiment in FIGS. 1 to 3, so that it is proposed to examine below only the differences compared to the first embodiment, the description above otherwise applying analogously. Furthermore the same reference numerals will be used for identical or similar parts.

As already explained with reference to the first embodiment of the clutch device 2, the recesses 84 in the second embodiment are not located in the flex plate 74 but in the hub part 56, in order to obtain especially deep internal recesses 84 in the radial direction 14. Alternatively it would also be possible in this case, however, to provide the recesses 84 in the flex plate 74, which then, however, should extend particularly far inwards in a radial direction 14.

In addition the retaining device 68 in the second embodiment does not consist of a circumferential groove and a circumferential collar, but is instead formed by multiple tapped holes 118 arranged on the end face of the input hub 16. The tapped holes 118, like the recesses 84, are uniformly distributed or spaced at an interval from one another in a circumferential direction. Thus in the rotational or assembly position of the hub part 56 a tapped hole 118 in each case aligns in an axial direction 8 or 10 with a recess 84 in the hub part 56. As retaining element of the pressing tool, a threaded shank (not shown) can now be passed in an axial direction 10 through the recesses 84 and screwed into the respective tapped hole 118. This gives the retaining element of the pressing tool an especially secure hold on the input hub 16. Otherwise the procedure for pressing the hub part 56 into the input hub 16, producing the press-fit toothing, is as described with reference to FIG. 3.

Alternatively it would also be feasible here to turn the threaded shanks serving as retaining elements about their longitudinal axis, so that the punch 116 is pressed in an axial direction 10 against the hub part 56 and presses the hub part 56 into the input hub 16, producing the press-fit toothing.

The invention claimed is:

1. A clutch device (2) comprising:
   at least one output hub (46, 48), constructed and arranged to be rotationally locked to a transmission input shaft (50, 52);
   an input hub (16), in which an assembly opening (54) is provided, constructed and arranged to allow a fastener (58, 60) for axially fixing the output hub (46) to the transmission input shaft (50) to be introduced; and
   a flex plate (74), on which a hub part (56) is provided, constructed and arranged to rotationally lock to the input hub (16), wherein the hub part (56) is constructed and arranged to connect to the input hub (16) to close the assembly opening (54); wherein the hub part (56) is constructed and arranged to rotationally lock to the input hub (16) by means of a slip-on gearing (100); wherein the slip-on gearing (100) is a press-fit toothing free of torsional play, the press-fit toothing being constructed and arranged so that during operation of the clutch device (2) the hub part (56) is in an axial direction (8, 10) immovably fixed to the input hub (16); wherein at least one recess (84) is provided in the hub part (56) or the flex plate (74), and at least one retaining device (68) is provided on the input hub (16) so that in a predefined rotational or assembly position of the hub part (56) and the flex plate (74) relative to the input hub (16) the retaining device (68) is arranged at least on a common radial with the recess (84) to allow a retaining element (114) of a pressing tool for producing the press-fit toothing to be fed through the recess (84) and connected to the retaining device (68); wherein the retaining device (68) is arranged on an end face of the input hub (16), and comprises at least one of a tapped hole (118) or a circumferential groove (70), which is constructed and arranged to engage with the retaining element (114) of the pressing tool.

2. The clutch device (2) as claimed in claim 1, wherein the hub part (56) is constructed and arranged to connect to the input hub (16) and close the assembly opening (54) with fluid-tight seal.

3. The clutch device (2) as set forth in claim 1 wherein the hub part (56) on its side remote from the input hub (16) comprises a first projection (86) which is constructed and arranged to extend within a central end-face recess (88) of an output shaft (82) of a power unit in a radial direction (12, 14) so that the first projection (86) and the output shaft (82) are supported against one another in a radial direction (12, 14).

4. The clutch device (2) as claimed in claim 3, wherein the first projection (86) in the axial direction (8, 10) comprises a section (90) facing the input hub (16) and a support section (92) remote from the input hub (16), the output shaft (82) being supportable solely on the support section (92) and the first projection (86).

5. The clutch device (2) as set forth in claim 1 wherein the flex plate (74), rotationally locked to the hub part (56), together with the hub part (56) forms a continuous module constructed and arranged to connect to the input hub (16), the flex plate (74) being integrally formed with the hub part (56), fixed by a materially cohesive joint to the hub part (56) or fixed to the hub part (56) by force closure and/or positively interlocking connection.

6. The clutch device (2) as set forth in claim 1 wherein the clutch device (2) further comprises a torsional vibration damper (4) and the input hub (16) of the clutch device (2) is formed by the input hub of the torsional vibration damper (4), and wherein the clutch device (2) is a multiple-clutch device.

7. The clutch device as set forth in claim 1 wherein the flex plate is flexible in the axial direction.

8. The clutch device as set forth in claim 1 wherein the flex plate (74) is configured and arranged to be flexible in the axial direction such that axial misalignment of the output shaft (82) of a power unit is not transmitted to the clutch device input hub (56).

9. A clutch device (2) comprising:
   at least one output hub (46, 48), constructed and arranged to rotationally lock to a transmission input shaft (50, 52);
   an input hub (16), in which an assembly opening (54) is provided, constructed and arranged to allow for a fastener (58, 60) for axially fixing the output hub (46) to the transmission input shaft (50) to be introduced; and
   a flex plate (74), on which a hub part (56) is provided, constructed and arranged to be rotationally locked to the input hub (16), wherein the hub part (56) is constructed and arranged to connect to the input hub (16) and close the assembly opening (54) wherein the hub part (56), on its side facing the input hub (16), comprises a second projection (94), constructed and arranged to allow for nesting in a radial direction (12, 14) with the input hub (16) so that the second projection (94) and the input hub (16) are supported against one another in a radial direction (12, 14): wherein the second projection (94) in the axial direction (8, 10) comprises a cylindrical sealing section (104) having a seal (108), which in the rotationally locked connection of the hub part (56) to the input hub (16) seals off a gap formed between the hub part (56) and the input hub (16); wherein a toothed section (96) is formed in the axial direction (8, 10) on the side of the second projection (94) facing the input hub (16) and the sealing section (104) is formed on the side of the second projection (94) remote from the input hub (16).

10. The clutch device (2) as claimed in claim 9 wherein the toothed section (96) of the second projection (94) comprises an external toothing (98) and the input hub (16) comprises an internal toothing (64), the external toothing and the internal toothing (98, 64) forming the slip-on gearing (100) in the rotationally locked connection of the hub part (56) to the input hub (16).

11. The clutch device (2) as set forth in claim 9 wherein the second projection (94) has a central end-face depression (110), constructed and arranged to accommodate the transmission input shaft (50).

12. The clutch device (2) as claimed in claim 9, wherein the hub part (56) is constructed and arranged to connect to the input hub (16) to close the assembly opening (54) with a fluid-tight seal.

13. The clutch device (2) as set forth in claim 9 wherein the hub part (56) on its side remote from the input hub (16) comprises a first projection (86) which extends within a central end-face recess (88) in an output shaft (82) of a power unit in a radial direction (12, 14) so that the first projection (86) and the output shaft (82) are supported against one another in a radial direction (12, 14).

14. The clutch device (2) as claimed in claim 13, wherein the first projection (86) in the axial direction (8, 10) comprises a section (90) facing the input hub (16) and a support section (92) remote from the input hub (16), the output shaft (82) being supported solely on the support section (92) and the first projection (86).

15. The clutch device (2) as set forth in claim 9 wherein the flex plate (74), rotationally locked to the hub part (56), together with the hub part (56) forms a continuous module constructed and arranged to connect to the input hub (16), the flex plate (74) being integrally formed with the hub part (56), fixed by a materially cohesive joint to the hub part (56) or fixed to the hub part (56) by force closure and/or positively interlocking connection.

16. The clutch device (2) as set forth in claim 9 wherein the clutch device (2) further comprises a torsional vibration damper (4) and the input hub (16) of the clutch device (2) is formed by the input hub of the torsional vibration damper (4), wherein the clutch device (2) is a multiple-clutch device.

17. The clutch device as set forth in claim 9 wherein the flex plate is flexible in the axial direction.

18. The clutch device as set forth in claim 9 wherein the flex plate (74) is configured and arranged to be flexible in the axial direction such that axial misalignment of the output shaft (82) of a power unit is not transmitted to the clutch device input hub (56).

19. The clutch device of claim 9 wherein the cylindrical sealing section (104) includes a circumferential groove (106) and wherein the seal (108) is seated inside of the groove (106).

* * * * *